United States Patent [19]

Jakobsen et al.

[11] 3,966,523

[45] June 29, 1976

[54] METHOD OF MAKING FILAMENT REINFORCED COMPOSITE RINGS FROM PLURAL FLAT FILAMENTARY SPIRAL LAYERS

[75] Inventors: Karl Severin Jakobsen, Somers; David Benjamin McLaughlin, South Windsor, both of Conn.

[73] Assignee: United Technologies Corporation, Hartford, Conn.

[22] Filed: Aug. 11, 1975

[21] Appl. No.: 604,300

[52] U.S. Cl. .............................. 156/169; 156/173; 156/182; 156/242; 156/306; 264/255; 264/258; 264/263; 264/DIG. 57; 264/DIG. 59; 416/230; 416/241 A
[51] Int. Cl.² ....................... B29D 3/02; B29G 5/00
[58] Field of Search .... 264/248, 255, 263, DIG. 57, 264/DIG. 59, 258; 156/169, 171, 173, 242, 180, 181, 182, 306, 245; 416/230, 241 A

[56] References Cited
UNITED STATES PATENTS

| 1,947,695 | 2/1934 | Carthew | 264/258 |
| 3,290,419 | 12/1966 | Groff et al. | 156/173 |
| 3,645,829 | 2/1972 | Palfreyman et al. | 156/169 |
| 3,813,185 | 5/1974 | Bouiller et al. | 416/230 |

*Primary Examiner*—Willard E. Hoag
*Attorney, Agent, or Firm*—Robert C. Walker

[57] ABSTRACT

Methods for forming a composite ring having unidirectional filaments embedded in a polymer matrix is disclosed. The filaments are spirally wound within the ring to form a plurality of essentially circular hoops which are in coaxial alignment with the expected lines of principle force. In one embodiment the formed ring is structurally integrated into the rotor of a gas turbine engine to reinforce the rotor and to restrain the rotor blades which extend outwardly of the ring.

10 Claims, 9 Drawing Figures

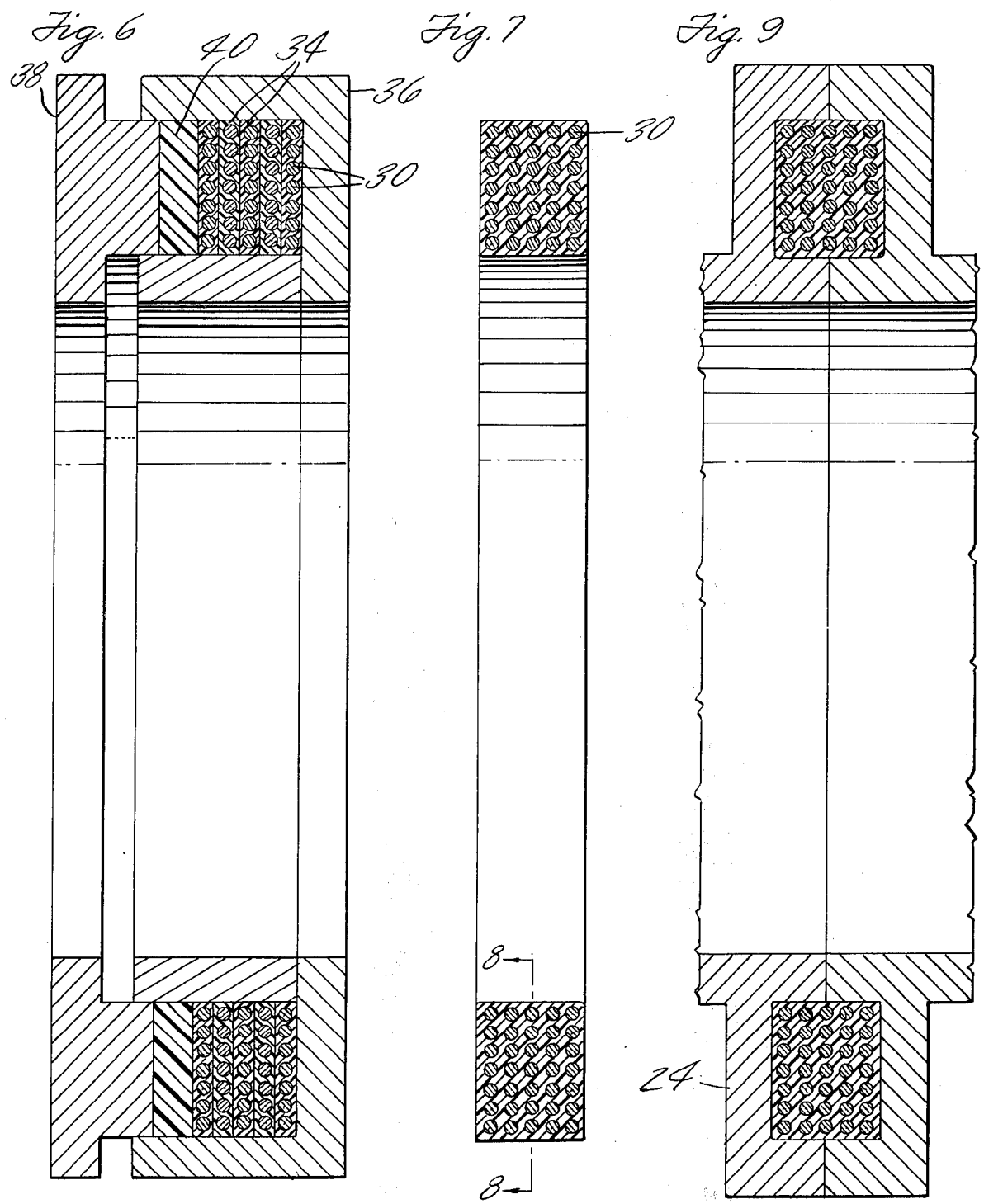

METHOD OF MAKING FILAMENT REINFORCED COMPOSITE RINGS FROM PLURAL FLAT FILAMENTARY SPIRAL LAYERS

BACKGROUND OF THE INVENTION

1. Field of the Invention

This invention relates to composite rings and more particularly to rings having a unidirectional substratum embedded in a polymer matrix.

2. Description of the Prior Art

Engineering achievement has long been associated with the availability of suitable materials of construction and with the development of methods of manufacture which optimize the inherent properties of the materials utilized. In recent years tremendous progress has been made in increasing the performance and durability of gas turbine engines through the use of various new metals and non-metallic materials. Further progress will depend upon the continued development of construction materials and upon the development of methods for manufacturing strong lightweight materials having increased specific stiffness and specific strength.

One group of construction materials having high specific stiffness and high specific strength are the composites which comprise a fibrous substratum embedded in a matrix. The substratum is the principle structural element of the composite and the matrix is a binder holding the substratum in a preferred orientation. Steady improvements have been made in substratum materials since glass fibers became widely used in the late 1930's and, specifically, within the aircraft industry a search for better reinforcing materials with high specific strength and high stiffness has provided numerous fibrous materials having attractive capabilities. The element boron, in particular, has been produced through recently developed techniques in a highly oriented and defect free form having the strength and stiffness properties required of fibers reinforcing compressor rotors.

The matrix in the composite structure adheres to the substratum and bonds the fibers together. Although any number of polymers including thermoplastic and thermosetting resins have been found to be suitable bonding materials, thermosetting polymides which have good thermal resistance up to temperatures of approximately 600°F are particularly well suited for bonding reinforcing fibers in the compressor rotor of a gas turbine engine.

A portion of the compressor section of a typical gas turbine engine is shown in FIG. 1. The compressor includes a rotor having a plurality of blades extending radially outward therefrom. The blades are arranged in rows with each row being conventionally mounted on a compressor disk. The FIG. 1 compressor includes a composite ring embedded within the rotor beneath a central row of blades. The ring replaces a compressor disk at a substantial weight savings when compared to the more conventional disk and blade construction seen upstream and downstream of the composite ring.

The composite ring shown in FIG. 1 has been manufactured according to one prior known technique by an in situ process wherein the rotor itself serves as a mandril upon which a plurality of filaments are wound as the rotor is turned. As the filaments are wound, a polyimide resin is applied and exudes between adjacent filaments as the next layer of filaments is wound upon the mandril. The wound matrix and filament composition is subsequently cured with the aid of the compression molding tool shown in FIG. 2 which is capable of applying a radial pressure load to the composition in the disk upon actuation of an axial plunger. Additional polyimide resin is forced into the composite structure by the plunger to compress and consolidate the resin between the filaments as curing agents and solvents are evaporated from the structure. Pressures as high as 350 psi and temperatures as high as 600°F are required by the described prior art method to fully consolidate and cure the matrix.

As is viewable in FIGS. 2 and 3 which are illustrative of the prior art, the filaments tend to distort during the curing process as the polyimide and fiber structure is compressed and consolidated. Deformation of the fibers from a uniformly circular pattern decreases the strength of the resulting structure and must be avoided where a high quality composite material is required. Substantial efforts are underway to produce composite rings in which the substratum of the completed article remains undistorted after the curing process.

SUMMARY OF THE INVENTION

The primary object of the present invention is to produce a composite ring having undistorted, unidirectional filaments embedded in a polymer matrix. Another object is to provide a composite reinforcing ring suitable for incorporation in the rotor of a gas turbine engine. A further object is to provide a method of manufacturing, at reduced cost, a composite ring having improved mechanical properties.

According to the present invention a composite ring having a plurality of spirally wound filaments in adjacent relationship is manufactured by winding each filament into a polymer matrix to form a monolayer sheet having essentially circular filament hoops, desolvating the polymer matrix of the monolayer sheets, stacking a plurality of the monolayer sheets in adjacent relationship and finally curing the polymer matrix in the stack of monolayer sheets under pressure to form a unitized composite ring.

A primary feature of the present invention is the monolayer sheet having included therein a reinforcing filament which is laid spirally into a polymer matrix material and is held essentially in a distortion free state throughout the ring fabrication process. Another feature of the invention is the unitized composite ring formed by curing the plurality of the monolayer sheets under pressure.

A principal advantage of the present invention is the increased ability of the embedded filament hoops to carry circumferential stresses. The filaments, which are spirally wound into a monolayer sheet, are coaxial with the expected lines of principle force in the formed ring. Another advantage is the improved ability to cure and consolidate polyimide and other resins, which conventionally require high temperature and pressure curing cycles, without distorting the included filaments. Precuring the monolayer sheets drives substantially all of the solvent and a large portion of the reaction product gases from the polymer to form a compact structure which is essentially free of voids.

The foregoing, and other objects, features and advantages of the present invention will become more apparent in the light of the following detailed description of the preferred embodiment thereof as shown in the accompanying drawing.

BRIEF DESCRIPTION OF THE DRAWING

FIG. 6 is a simplified illustration of apparatus used in consolidating a plurality of the monolayer sheets to form a composite ring;

FIG. 7 is a simplified illustration of the ring as removed from the FIG. 6 consolidating apparatus;

FIG. 8 is a sectional view taken along the line 8—8 as shown in FIG. 7; and

FIG. 9 is an enlarged cross section view of a portion of the compressor rotor of FIG. 1 showing the composite ring embedded therein.

DESCRIPTION OF THE PREFERRED EMBODIMENT

Figure 1:
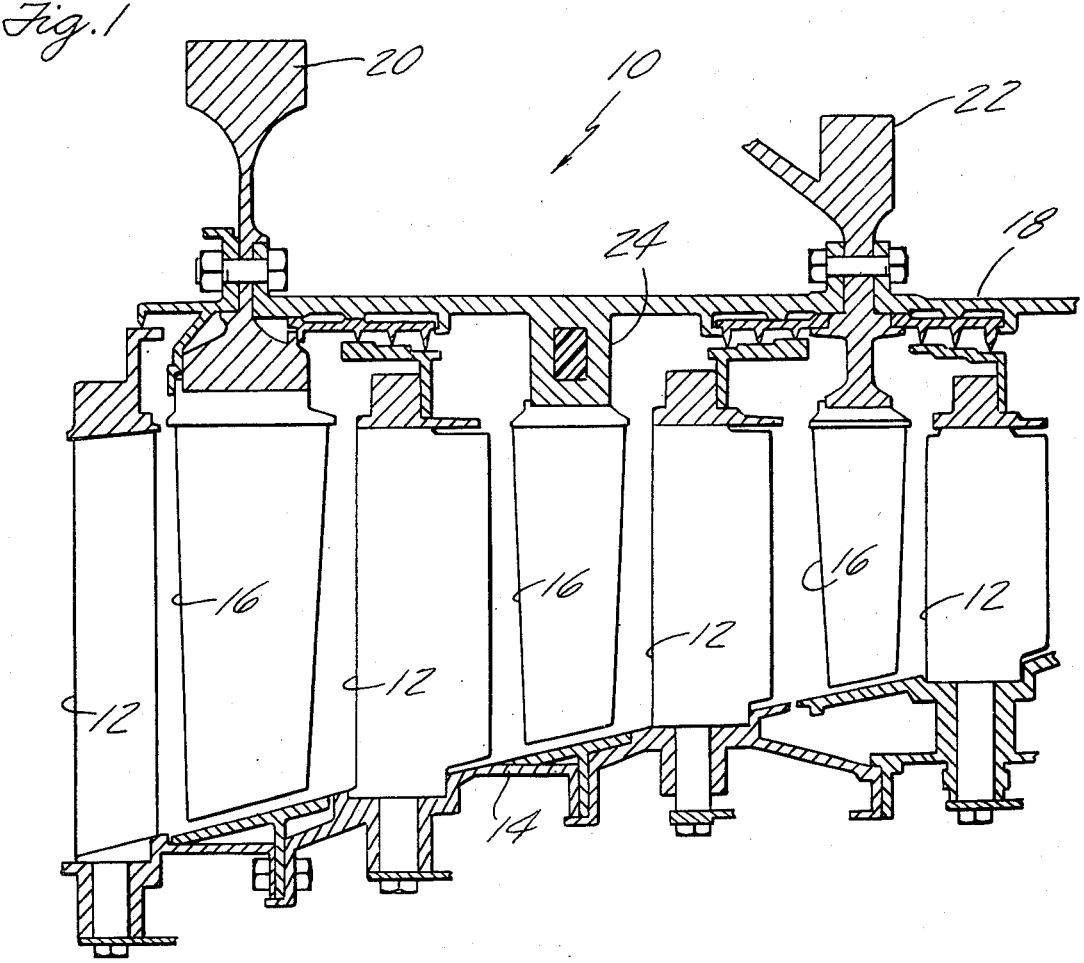
FIG. 1 is a simplified cross section view of a portion of the compressor section of a gas turbine engine.
Figure 2:
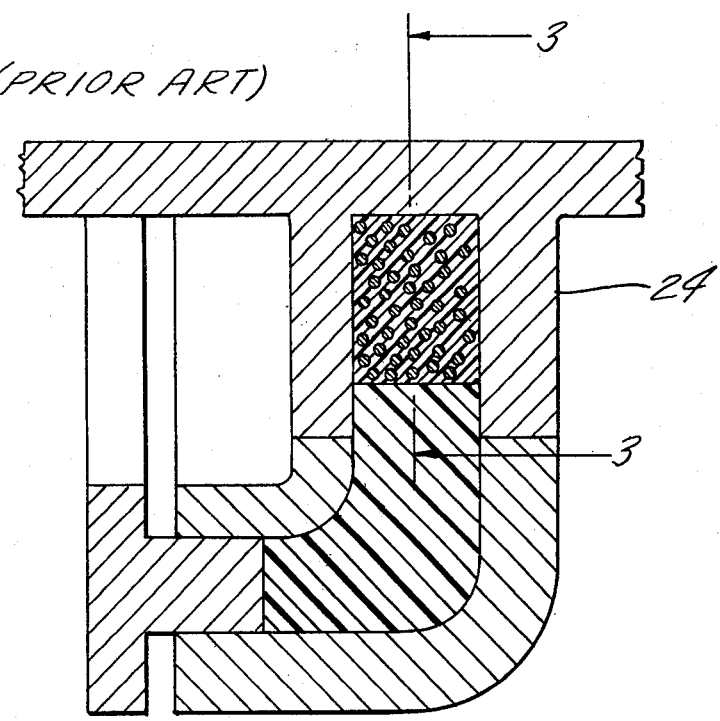
FIG. 2 is a simplified illustration of prior art apparatus for forming a composite ring within the rotor of a gas turbine engine.

A portion of the compressor section 10 of a gas turbine engine is shown in FIG. 1. Within the compressor section a plurality of vanes 12 are attached to and extend radially inward from the case 14. A plurality of blades 16 are attached to and extend radially outward from a rotor 18. An upstream disk 20 having a conventional contour radially restrains a first row of the blades 16. A downstream disk 22, which also has a conventional contour, radially restrains a third row of the blades 16. A composite reinforced disk 24 intermediate of the upstream disk 20 and the downstream disk 22 radially restrains a second row of the blades 16. The reinforced disk 24 is manufactured from a metallic material but includes a composite reinforcing ring embedded therein. The composite ring is formed of a fibrous substratum which is embedded in a polymer matrix as is discussed in the prior art section of the present specification.

Figure 4:
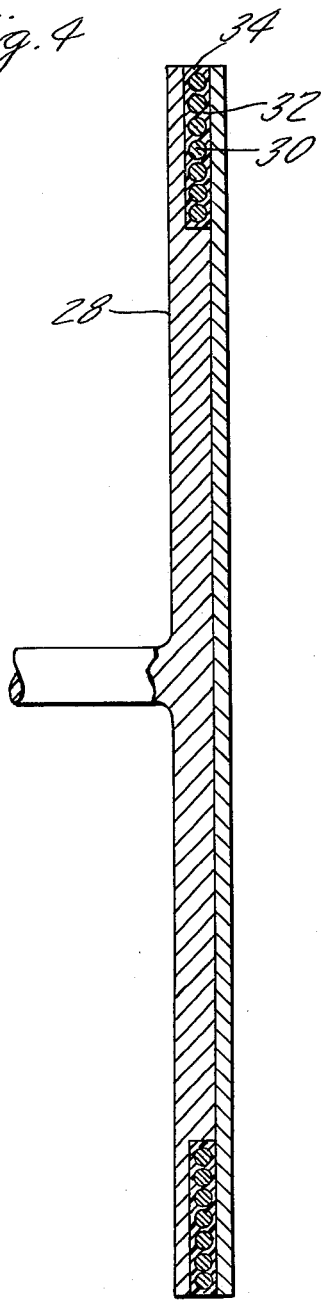
FIG. 4 is a simplified illustration of apparatus used in forming a monolayer sheet of spirally wound filaments.
Figure 5:
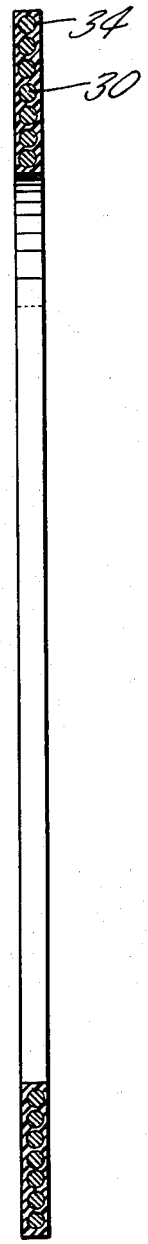
FIG. 5 is a simplified illustration of a monolayer sheet as removed from the FIG. 4 forming apparatus.

The composite ring of the present invention comprises a plurality of washer shaped segments which are joined in abutting relationship to form the ring. Referring to FIG. 4, each individual segment is formed within a split mandril 28 by spirally winding a reinforcing filament 30 into a matrix material 32 to form a monolayer sheet 34 having a single filament thickness. The monolayer sheet 34, as detached from the mandril, appears in FIG. 5. The sheet has a washer shaped contour which includes the reinforcing filament 30 wound spirally therein. A plurality of the monolayer sheets 34 are placed in a ring mold 36 which is shown in FIG. 6. The sheets 34 are stacked in axially adjacent relationship and are compressed together by the plunger 38. Excess matrix material 40 is disposed between the plunger and the stack of adjacent sheets and is forced between the filaments 30 to fill resulting voids as the solvents and curing agents are driven from the matrix material. A fully formed ring is shown in cross section in FIG. 7. Each filament 30 remains in substantial planar alignment as originally deposited in the mandril.

The filaments provide very high strength and very high stiffness characteristics to the composite structure. Filaments formed of such materials as boron, silicon and boron carbides, aluminum oxide, and carbon all possess very high strength characteristics and are suitable materials. In one preferred construction the reinforcing filament is fabricated from the element boron. Commercially available boron filaments of approximately 5 mils diameter have been effectively utilized in the production of composite rings for compressor rotors although it is expected that filaments of a somewhat greater or lesser diameter will also be suitable. Silicon carbide and carbon filaments as well as other materials having suitable specific strength and stiffness are becoming increasingly attractive as manufacturing techniques improving the quality and commercial availability of these filaments are being developed.

The inherent polymer characteristics of low density, low electrical and thermal conductivities, and extreme mechanical resiliency combine to provide a superb material for composite matrices. Many commercially available polymers such as epoxies, nylon, the polybenzimidazole resins, and polyimide resins are suitable matrix materials. In particular the polyimide resins, which have high temperature capabilities in excess of 600°F, are well suited for use in the compressor sections of gas turbine engines. One polyimide resin known within the industry as P-13-N resin is manufactured by CIBA-GEIGY CORPORATION of Ardsley, New York and has been utilized with boron fibers to form a composite ring as described herein. Other thermoplastic or thermosetting resins which are not specifically mentioned herein may also have utility in the formation of composite rings by the present methods.

In the initial fabrication step, a monolayer sheet containing a spirally wound filament embedded in a polymer matrix is formed within a mandril as is shown in FIG. 4. The mandril has a groove which faces outwardly to accept the filament and the polymer. The groove of the mandril has a width which is approximately 20 percent greater than the diameter of the filament selected. Each individual monolayer sheet may comprise any number of spiral windings with the limit being determined only by the size of the mandril. To aid in the removal of the monolayer sheet the mandril is split and may include, at the sides of the groove, separation papers which are removable from the mandril with the monolayer sheet. Additionally, the mandril may include a plurality of the grooves which are simultaneously filled as the mandril is rotated.

The polymer as deposited in the mandril has a paste-like consistency and has included therein various solvents and curing agents. Before the composite structure is removed from the mandril the polymer is partially desolvated to provide a matrix structure capable of holding the spirally wound filaments in undistorted relation to each other. Although each monolayer sheet may retain a tacky consistency when removed from the mandril, each sheet is sufficiently rigid to enable handling without distortion of the fibers.

A plurality of the monolayer sheets are placed in adjacent relationship within the ring mold 36 which is shown in simplified form in FIGS. 6. In one preferred method the stacked monolayer sheets are heated in a precuring step to drive substantially all of the remaining solvents and a portion of the curing agents from the polymer matrix. The precuring step if utilized with P-13-N resin is accomplished without pressure but at an elevated temperature of approximately 390°F.

In the final curing step the stack of monolayer sheets within the ring mold is consolidated as the plunger 38 is inserted into the mold and the structure is compressed to form a unitized ring. The mold and composite structure may also be heated as required to further the curing process. Additional matrix material 40 is deposited between the plunger and the stack of sheets to distribute the plunger pressure equally on the sheets and to provide a source of additional matrix material which is urged into voids left by the evaporating solvents and curing agents.

Figure 3:
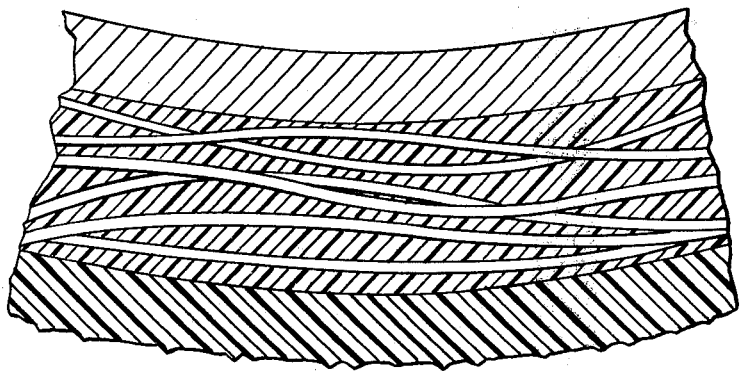
FIG. 3 is a sectional view taken along the line 3—3 as shown in FIG. 2.

A composite ring produced in accordance with the above described methods retains the spirally wound filaments in radial alignment as is shown in FIG. 7. Each spirally wound filament is identifiably distinct from the adjacent spirally wound filament notwithstanding full integration of the matrix material. Furthermore, each filament winding retains a uniformly arcuate shape without radial distortion as can be seen in the FIG. 8 cross sectional view when compared to the prior art view of FIG. 3.

The composite ring formed in accordance with the above described methods is suitable for inclusion in the compressor rotor of a gas turbine engine as a structural reinforcement to the rotor in the retention of a row of the blades 16 as is shown in FIG. 1.

Although the invention has been shown and described with respect to a preferred embodiment thereof, it should be understood by those skilled in the art that various changes and omissions in the form and detail thereof may be made therein without departing from the spirit and the scope of the invention.

Having thus described a typical embodiment of our invention, that which we claim as new and desire to secure by Letters Patent of the United States is:

1. The method of making a composite ring having a plurality of undirectional filaments embedded in a polymer matrix comprising:
    winding a filament into a solvated curable polymer matrix containing curing agents to form a monolayer sheet comprising a filamentary flat spiral;
    desolvating the polymer matrix of the monolayer sheet to hold the filament in position in the sheet;
    stacking a plurality of the monolayer sheeets in adjacent relationship in an annular mold cavity; and
    curing the polymer matrix in the stacked monolayer sheets under pressure in said mold cavity to form a unitary composite ring.

2. The method according to claim 1 wherein the filament is comprised of a material selected from the group consisting of boron, carbon, silicon and boron carbides, and aluminum oxide.

3. The method according to claim 1 wherein separation papers are placed along the sides of the groove in the mandril prior to the step of winding the filament therein.

4. The method according to claim 1 wherein the polymer matrix is a material selected from the group consisting of epoxys, nylon, polybenzimidzole resins.

5. The method according to claim 1 wherein the polymer matrix is a polyimide resin.

6. The method according to claim 1 wherein the step of curing the polymer matrix includes subjecting the matrix to a pressure to approximately 350 psi to fully integrate the matrix material and form a unitized composite ring.

7. The method of claim 1 wherein the monolayer sheet is formed by winding the filament into an outwardly facing peripheral groove of a mandril and wherein the polymer matrix is introduced into the groove during the filament winding step.

8. The method according to claim 7 wherein the groove of the mandril has a width which is approximately 120% of the diameter of the filament wound therein.

9. The method of claim 1 including after the stacking step, the further step of heating the stacked monolayer sheets to drive off substantially all solvent and a portion of the curing agents from the polymer matrix.

10. The method according to claim 9 wherein the heating step is accomplished at an elevated temperature of approximately 390°F.

* * * * *